United States Patent
Sharma et al.

(10) Patent No.: US 9,953,160 B2
(45) Date of Patent: Apr. 24, 2018

(54) APPLYING MULTI-LEVEL CLUSTERING AT SCALE TO UNLABELED DATA FOR ANOMALY DETECTION AND SECURITY

(71) Applicant: PAYPAL, INC., San Jose, CA (US)

(72) Inventors: Avani Goel Sharma, San Jose, CA (US); Fransisco Kurniadi, Dublin, CA (US)

(73) Assignee: PayPal, Inc., San Jose, CA (US)

( * ) Notice: Subject to any disclaimer, the term of this patent is extended or adjusted under 35 U.S.C. 154(b) by 184 days.

(21) Appl. No.: 14/881,976

(22) Filed: Oct. 13, 2015

(65) Prior Publication Data

US 2017/0103203 A1   Apr. 13, 2017

(51) Int. Cl.
  *G06F 21/55*   (2013.01)
  *G06F 17/30*   (2006.01)

(52) U.S. Cl.
  CPC ...... *G06F 21/552* (2013.01); *G06F 17/30598* (2013.01)

(58) Field of Classification Search
  CPC ........ H04M 1/725; G06F 17/30; G06F 21/55; G06Q 40/00; G06Q 50/00; G06Q 10/10
  USPC ................... 726/22–25; 707/738; 705/35, 37
  See application file for complete search history.

(56) References Cited

U.S. PATENT DOCUMENTS

| | | | | |
|---|---|---|---|---|
| 7,590,642 B2 * | 9/2009 | Campos | ............ | G06F 17/30601 |
| 7,729,964 B2 * | 6/2010 | Senturk | ................. | G06Q 40/00 |
| | | | | 705/35 |
| 8,949,239 B2 * | 2/2015 | Ruffner | ............ | G06F 17/30867 |
| | | | | 707/738 |
| 9,154,605 B2 * | 10/2015 | Stovicek | ................ | G06Q 10/10 |

OTHER PUBLICATIONS

Bouguettaya, et al., Information Sciences, vol. 112, Issues 1-4, Dec. 1998, 2 pages.
Bolton, Richard J., et al., Unsupervised Profiling Methods, Department of Mathematics, Imperial College, London, 2001, 16 pages.
Cluster Analysis, https://en.wikipedia.org/wiki./Cluster_analysis, accessed on Oct. 21, 2015, 18 pages.

(Continued)

*Primary Examiner* — Thanhnga B Truong
(74) *Attorney, Agent, or Firm* — Haynes and Boone, LLP

(57) ABSTRACT

Methods, systems, and computer program products for applying multi-level clustering at scale to unlabeled data for anomaly detection and security are disclosed. A computer-implemented method may include receiving transactional data associated with a plurality of user accounts, analyzing the transactional data of the accounts in view of a clustering model, associating each of the accounts with one of multiple peer groups from the clustering model, detecting anomalous account behavior in a peer group in view of a scatteredness score computed for each account in the peer group where each scatteredness score is computed based on a neighborhood of accounts in the peer group determined for each respective account of the peer group, and creating a report comprising account and scatteredness score information for one or more of the accounts in the peer group associated with detected anomalous account behavior.

20 Claims, 4 Drawing Sheets

(56) References Cited

OTHER PUBLICATIONS

Chawla, Nitesh V. et al., Learning From Labeled and Unlabeled Data: An Empirical Study Across Techniques and Domains, Journal of Artificial Intelligence Research 23, AI Access Foundation, published Mar. 2005, 36 pages.

Lv, Lin-Tao et al., A RBF Neutral Network Model for Anti-Money Laundering, Proceedings of the 2008 International Conference on Wavelet Analysis and Pattern Recognition, Hong Kong, Institute of Computer Science and Engineering, Xi' an University of Technology, Xi' an 710048, China, Aug. 30-31, 2008, 7 pages.

Stefanowski, Jerzy, Dana Mining—Clustering, Institute of Computing Sciences, Poznan University of Technology, Poznan, Poland, Lecture 7, SE Master Course, 2008/2009, http://www.cs.put.poznan.pl/jstefanowski/sed/DM-7clusteringnew.pdf, 113 pages.

Zhang, Ke et al., A New Local Distance-Based Outlier Detection Approach for Scattered Real-World Data, RSISE, Australian National University, ACT 2601, Australia, 2009, 15 pages.

Mak, Mark K. Y., et al., A Financial Data Mining Model for Extracting Customer Behavior, INTECH Open Access Publisher, Department of Industrial and Systems Engineering, The Hong Kong Polytechnic University, China, Int.j.eng.bus,manag., vol. 3, No. 3, 59-72, 2011, 14 pages.

Aneetha, A. S., et al., The Combined Approach for Anomaly Detection Using Neural Networks and Clustering Techniques, An International Journal (CSEIJ), vol. 2, No. 4, Department of Computer Science & Engineering, Anna University, Chennai, 600025, India, Aug. 2012, 10 pages.

Chawla, Sanjay et al., k-means—: A Unified Approach to Clustering and Outlier Detection, University of Sydney, Australia, Aalto University, Finland, 2013, 9 pages.

Kharote, Mahesh et al., Data Mining Model for Money Laundering Detection in Financial Domain, International Journal of Computer Applications (0975-8887), vol. 85, No. 16, Jan. 2014, 4 pages.

2.3. Clustering—Scikit-learn 0.16.1 documentation, http://scikit-learn.org/stable/modules/clustering.html#k-means, downloaded Aug. 13, 2015, 28 pages.

Sklearn.Cluster.k-means, http://scikit-learn.org/stable/modules/generated/sklearn.cluster.k_means.html#sk-learn.cluster.k_means, downloaded Aug. 13, 2015, 3 pages.

2.1. Gaussian Mixture Models, http://scikit-learn.org/stable/modules/mixture.html#mixture, downloaded Aug. 13, 2015, 7 pages.

Sklearn.svm.OneClassSVM, http://scikit-learn.org/stable/modules/generated/sklearn.svm.OneClassSVM.html#sklearn.svm.OneClassSVM, downloaded Aug. 13, 2015, 5 pages.

* cited by examiner

APPLYING MULTI-LEVEL CLUSTERING AT SCALE TO UNLABELED DATA FOR ANOMALY DETECTION AND SECURITY

TECHNICAL FIELD

The present disclosure generally relates to computer systems and, more particularly, to the security of computer systems, computer networks, Internet services.

BACKGROUND

Cybercrime generally refers to criminal activity involving computer systems. Such activity includes the use of computer systems to perpetrate various crimes including money laundering. Money laundering generally describes the process of taking "dirty" money made from illegal activities and "cleaning" the money so that the money then appears to have originated from a legitimate source.

In recent years, money laundering techniques involving online payment accounts and virtual currencies have become more complex and elusive. For example, criminals may deposit funds in many small transactions across multiple online payment accounts to avoid detection. Criminals also may choose to move money through foreign accounts in jurisdictions providing fewer regulations and greater secrecy. Further, virtual currencies allow criminals to move funds secretly between various accounts beyond regulation. As such, virtual currencies have resulted in problems not present with conventional currencies, such as paper money.

Money laundering and other fraudulent online financial schemes continue to increase both in volume and sophistication. Therefore, providing new and improved ways of detecting and stopping such criminal activity are of importance.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

DETAILED DESCRIPTION

Systems, methods, and computer program products for applying multi-level clustering at scale to unlabeled data for anomaly detection and security are disclosed. The occurrences and magnitude of exposed online money laundering schemes have increased substantially in recent years. In addition, criminals continue to develop new and sophisticated ways of laundering money and secretly funding illegal activities beyond the detection of authorities. In many cases, such activity has gone unnoticed for years.

In examples of the present disclosure, a risk detection system analyzes account activity to detect and report unusual, anomalous, or illegal activity associated with one or more accounts. In an example, the risk detection system generates a first clustering model to use for assigning each of a plurality of accounts to one of multiple peer groups. The risk detection system receives transactional data associated with the accounts and analyzes the data based on the first clustering model to assign each of the accounts to one of the peer groups.

In examples of the present disclosure, the risk detection system also applies a second clustering model to accounts in a peer group as part of detecting anomalous account behavior. The risk detection system determines a neighborhood of accounts for each account in the peer group and computes a "scatteredness score" for each account in the peer group based on respective neighboring accounts. The risk detection system further generates a report comprising account and scatteredness score information for one or more of the accounts in the peer group associated with unusual, anomalous, or illegal account behavior.

Accordingly, aspects of the present disclosure provide efficient and effective ways of detecting and reporting unusual, suspicious, or illegal activity among a large number of electronic financial accounts. As such, examples of the present disclosure provide increased accuracy and fewer false-positive results in anomaly detection as compared to previously known methods.

Figure 1:
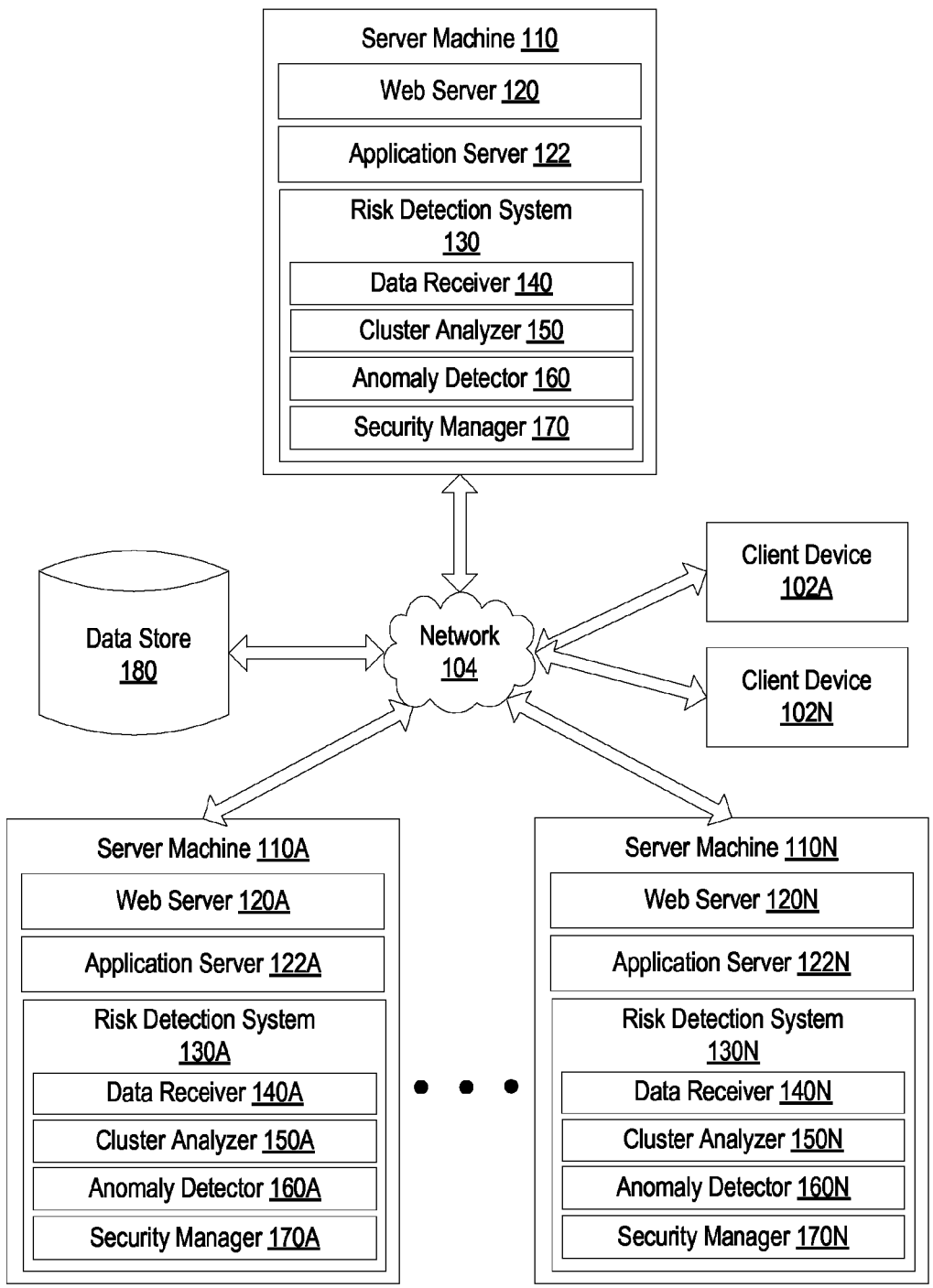
FIG. 1 is a block diagram illustrating a system architecture, in accordance with various examples of the present disclosure.

FIG. 1 illustrates an exemplary system architecture 100 in which examples of the present disclosure may be implemented. System architecture 100 includes a plurality of server machines 110, 110A, 110N, one or more data stores 180, and one or more client devices 102A, 102N connected via one or more networks 104.

Network 104 may be a public network (e.g., the Internet), a private network (e.g., local area network (LAN) or wide area network (WAN)), or any combination thereof. In an example, network 104 may include the Internet, one or more intranets, wired networks, wireless networks, and/or other appropriate types of communication networks. Network 104 also may comprise a wireless telecommunications network (e.g., cellular phone network) adapted to communicate with other communication networks, such as the Internet. In addition, network 104 may include one or more short-range wireless networks or beacon networks.

Data store 180 generally refers to persistent storage capable of storing various types of data, such as text, audio, video, and image content. In some examples, data store 180 may include a network-attached file server, while in other examples data store 180 may include other forms of persistent storage such as an object-oriented database, a relational database, and so forth.

Client devices 102A, 102N generally may be a personal computer (PC), laptop, mobile phone, tablet computer, server computer, wearable computing device, or any other type of computing device (i.e., a client machine). Client devices 102A-102N may run an operating system (OS) that manages hardware and software of the client devices 102A-102N. A browser (not shown) may run on client devices 102A-102N (e.g., on the OS of client devices 102A-102N). The browser may be a web browser that can access content and services provided by web server 120, application server 122, or a combination of web server 120 and application server 122. Other types of computer programs and computer scripts also may run on client devices 102A-102N.

Server machines 110, 110A, 110N each may include one or more web servers 120, 120A, 120N and application servers 122, 122A, 122N. Web servers 120-120N may provide text, audio, image, and video content to and from server machines 110-110N or other sources (e.g., data store 180) and client devices 102A-102N. Web servers 120-120N also may provide web-based application services, business logic, and updates to server machines 110-110N and client devices 102A-102N. Server machines 110-110N may locate, access, and consume various forms of content and services from various trusted (e.g., internal, known) web servers 120-120N and application servers 122-122N and various untrusted (e.g., external, unknown) web and application servers using applications, such as a web browser, web servers, various other types of computer applications, etc. Web servers 120-120N also may receive text, audio, video, and image content from client devices 102A-102N, which may be stored in data store 180 for preservation and/or sharing of content.

In an example, web servers 120-120N are coupled to one or more respective application servers 122-122N that provide application services, data, business logic, and/or APIs to various server machines 110-110N and client devices 102A-102N. In some examples, application servers 122-122N provide one or more such services independently, without use of web servers 120-120N.

In an example, web servers 120-120N may provide server machines 110-110N and client devices 102A-102N with access to one or more application server 122-122N services associated with risk detection systems 130-130N. Such functionality also may be provided as part of one or more different web applications, standalone applications, systems, plug-ins, web browser extensions, and application programming interfaces (APIs), etc. In some examples, plug-ins and extensions generally may be referred to, individually or collectively, as "add-ons."

In an example, client devices 102A-102N may include an application associated with a service provided by one or more server machines 110-110N (e.g., risk detection systems 130-130N). For example, various types of computing devices (e.g., smart phones, smart televisions, tablet computers, smart wearable devices, smart home computer systems, etc.) may use specialized applications to access services provided by server machines 110-110N, to issue commands to server machines 110-110N, and/or to receive content from server machines 110-110N without visiting or using web pages.

Server machines 110-110N each include data receiver 140-140N modules, cluster analyzer 150-150N modules, anomaly detector 160-160N modules, and security manager 170-170N modules of respective risk detection systems 130-130N. In various examples, such modules may be combined, divided, and organized in various arrangements on one or more computing devices.

In an example, functions performed by one or more of the server machines 110A-110N also may be performed by one or more other server machines 110A-110N and/or client devices 102A-102N, in whole or in part. In addition, the functionality attributed to a particular component may be performed by different or multiple components operating together. In addition, server machines 110-110N may be accessed as a service provided by systems or devices via appropriate application programming interfaces (APIs) and data feeds, and thus are not limited to use with websites.

In an example, one or more server machines 110-110N may be specialized security devices dedicated to providing risk detection system 130-130N and other security-related services. In one example, server machines 110-110N may include one or more of a server computer, router, a switch, a firewall, a security appliance, a dedicated computing device, a shared computing device, a virtual machine, virtual machine guests, etc. In some examples, server machines 110-110N perform activities associated with risk detection systems 130-130N in addition to various other security activities, such as network security, application security, file security, data security, etc.

Figure 2:
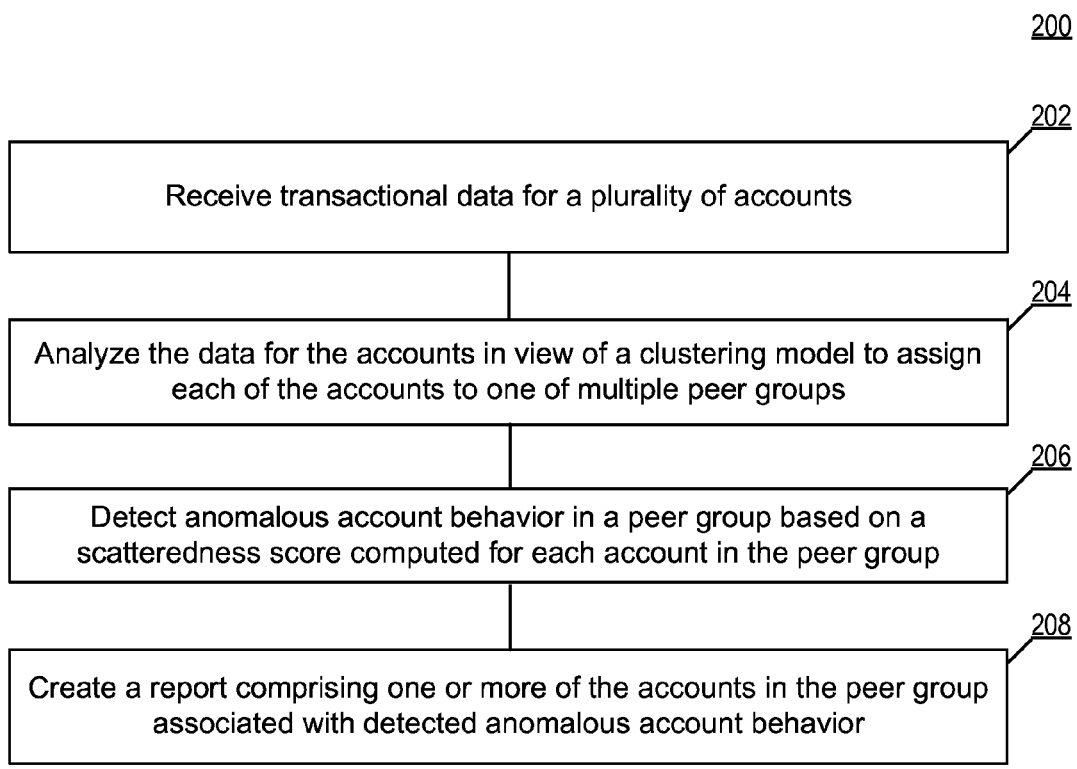
FIG. 2 is a flow diagram for detecting anomalous account behavior by applying clustering to unlabeled data, in accordance with examples of the present disclosure.

FIG. 2 is a flow diagram for detecting anomalous account behavior by applying clustering to unlabeled data, in accordance with examples of the present disclosure. The method 200 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof. Examples of method 200 are described with respect to risk detection system 130 for the sake of consistency. Such examples also generally apply to other risk detection systems 130A-130N, as described herein.

Method 200 begins at block 202 when data receiver 140 of risk detection system 130 receives transactional data for a plurality of accounts. In an example, data receiver 140 receives identifying, transactional, and other data associated with online financial accounts in an online payment system. For example, data receiver 140 may receive identifying and descriptive data associated with each online payment account and respective owners of online payment accounts. Descriptive data generally may include associations between an online payment account and one or more other financial accounts. In addition, data receiver 140 also may receive various transactional data (e.g., deposits, withdrawals, payments, gifts, etc.) associated with each of the online payment accounts or groupings of online payment accounts (e.g., households, organizations, etc.).

Transactional data generally refers to data describing transactions between a plurality of online payment accounts of a user, a set of related users, or a set of different and unrelated users. Transactional data also generally refers to data describing a series of transactions occurring across one or more groups of different online payment accounts over a period of time. For example, transactional data may include information about deposits made from funding sources into an online payment account. Transactional data also may include associating a first transaction (e.g., a payment made from a payment account) with a second transaction (e.g., a deposit into another payment account), for example, based on a transaction involving a consumer and a merchant. In addition, funds deposited into one online payment account may be traced throughout an online payment system as funds fully or partially moved into other online payment accounts as part of legitimate transactions or a fraudulent scheme.

Transactional data also may include data describing movement of funds from one online payment account to one or more other online payment accounts associated with the same provider or a different online payment system provider. In addition, transactional data may comprise financial transaction data from both sides or perspectives of a transaction (e.g., sender and receiver, buyer and seller, consumer and merchant, etc.) for financial transactions occurring throughout an online payment system network.

At block 204, cluster analyzer 150 of risk detection system 130 analyzes data for accounts in view of a clustering model to assign each of the accounts to one of multiple peer groups. In an example, cluster analyzer 150 analyzes transactional data and other data associated with online payment accounts. In addition, cluster analyzer 150 may build a clustering model to analyze the data associated with the online payment accounts.

Cluster analysis or "clustering" generally refers to a process of grouping a set of data or objects (e.g., accounts, transactions, etc.) into a set of meaningful subclasses called "clusters" according to a natural grouping or structure of the data. Clustering generally is a form of data mining or data discovery used in unsupervised learning of unlabeled data. Unsupervised learning generally refers to the task or goal of finding hidden structure in unlabeled data. Unlabeled data generally refers to data in its natural form that has not been labeled, tagged, or pre-categorized based on human or machine analysis prior to clustering.

Clustering differs from rule-based categorization systems in that clustering partitions or groups a set of data or objects according to a natural structuring of the data rather than through rules and artificial labels applied to the data. In general, clustering partitions data based on a natural form of the data without relying on rules or evaluating supplemental descriptive labels applied to the data by humans or machines. As such, clustering is data driven rather than rules-based.

In an example, cluster analyzer 150 builds a clustering model for assigning accounts to one of multiple peer groups. For example, cluster analyzer 150 may assign each of a plurality of accounts to one of several peer groups recognized by a clustering model to partition or group the accounts naturally based on associated data.

In an example, cluster analyzer 150 receives one or more sets of transactional data to use for building the clustering model during a training period. For example, cluster analyzer 150 may receive a subset or focused set training data associated for each one or more peer groups as part of a machine-learning process. During the training period, cluster analyzer 150 trains a clustering model to recognize accounts associated with one of several peer groups based on natural behavior of the accounts in a peer group. Training periods for each group may be performed together at one time or separately at different times using subsets of focused data.

In an example, cluster analyzer 150 builds a clustering model based on a set of one or more factors (e.g., behaviors or natural attributes of accounts and associated transactional data) by training the clustering model to recognize factors associated with different peer groups. The factors used in building a clustering model may be a preliminary set of factors used as part of a machine-learning process for assigning accounts to peer groups.

In an example, one or more other sets of factors may be used in performing anomaly detection within a peer group after accounts have been assigned to a peer group. As an example, cluster analyzer 150 may use a first set (e.g., two, ten, fifteen, or any number) of preliminary factors for training a clustering model to assign accounts to one of several peer groups. In addition, a second set of anomaly detection factors (e.g., ten, twenty, thirty, fifty, one hundred, one thousand, etc.) may be used at another time to perform thorough, in-depth anomaly detection on the accounts within a peer group.

In an example, cluster analyzer 150 receives transactional and other account data for online payment accounts. Cluster analyzer 150 then uses an existing clustering model to assign each of the accounts to one of multiple peer groups known by the clustering model. For example, cluster analyzer 150 may assign each account to a single peer group based on a connectivity based or hierarchical clustering model, a centroid or k-means clustering model, a distribution based or Gaussian Expected-Maximization (EM) model, a general density based or density based spatial clustering of applications with noise (DBSCAN) model, or generally any other type of clustering model for use in partitioning data.

In an example, cluster analyzer 150 assigns each online payment account to one of a new account peer group, an established account peer group, a cross-border account peer group, or a high-volume account peer group based on a clustering model. Such peer groups are provided generally as an illustrative example, and any number of peer groups representing any types of account or transactional behaviors may be taught to and recognized by a clustering model.

At block 206, anomaly detector 160 of risk detection system 130 detects anomalous account behavior in a peer group based on a scatteredness score computed for each account in the peer group. In an example, anomaly detector 160 performs anomaly detection for a peer group by analyzing transactional, account, and other data based on a second clustering model. In one example, anomaly detector 160 determines a neighborhood of accounts for each account in a peer group based on data analysis output from the second clustering model and computes a scatteredness score for each account in the peer group based on a corresponding account neighborhood determined for each account.

In an example, anomaly detector 160 performs anomaly detection on accounts of a peer group previously created by cluster analyzer 150 according to a first clustering model associated with a first set of one of more factors. In one example, anomaly detector 160 may begin anomaly detection for a peer group by building and using the second clustering model to analyze account and transactional data associated within the particular peer group.

In an example, the second clustering model used by anomaly detector 160 to analyze data within a peer group also may be pre-built or in existence, for example, prior to formation of the peer group or commencement of anomaly detection. In addition, the second clustering model used by anomaly detector 160 may be generated for use in detecting unusual or anomalous account behavior within a specific peer group. Further, anomaly detector 160 may use a different "secondary" clustering model for each different peer group to analyze and identify anomalous account behavior within each respective peer group.

In an example, a secondary clustering model that anomaly detector 160 uses to analyze data and detect unusual behavior within a peer group is based on a second or different set of factors in comparison to the factors of a first clustering model used by cluster analyzer 150 to assign accounts to one of multiple peer groups. For example, the factors associated with the first clustering model may focus on distributing each account to an appropriate peer group (e.g., total number and amount of transactions, account tenure, etc.). In addition, the factors associated with the second clustering model may focus on exposing and detecting anomalous behavior among online payment accounts within a peer group. (e.g., number of unique senders and receivers, number of linked accounts, low-, medium-, and long-term transaction volume, etc.).

In various examples, there may be some overlap between the factors associated with the first clustering model and the second set of factors associated with the second clustering model. However, in examples, the number of factors associated with a secondary clustering model for anomaly detection generally is greater than the number of factors associated with a clustering model used for initially distributing accounts across peer groups.

In an example, the second clustering model used for anomaly detection may be a connectivity based or hierarchical clustering model, a centroid or k-means clustering model, a distribution based or Gaussian Expected-Maximization (EM) model, a general density based or density based spatial clustering of applications with noise (DBSCAN) model, or generally any other type of clustering model for use in anomaly detection. As such, examples of the present disclosure may use the same clustering model type or different clustering model types when performing each of peer group assignments, anomaly detection, or other activities.

In an example, anomaly detector 160 analyzes account and transactional data for a peer group using the second clustering model. For example, anomaly detector 160 may analyze peer group data by performing multidimensional clustering analysis on the data based on factors associated with a clustering model used for risk detection in online payment systems.

Multidimensional clustering analysis generally refers to clustering analysis performed on data based on two or more dimensional factors of a clustering model. Multidimensional clustering analysis may be performed using any number of dimensional factors of a clustering model (e.g., three, ten, twenty, fifty, one hundred, many thousands, etc.). In various examples, multidimensional clustering analysis is performed using a large number of dimensional factors. In some examples, such multidimensional analysis generally may be difficult to visualize, and thus may not be associated with visual output or visually comprehensible output.

In an example, anomaly detector 160 determines a neighborhood of accounts for each of the accounts in a peer group. For example, anomaly detector 160 may use a neighborhood of accounts determined for each account in a peer group to detect anomalous account behavior occurring within the peer group. In one example, anomaly detector 160 detects anomalous account behavior in a peer group based on how closely each account behaves as compared to its respective account neighborhood.

In an example, anomaly detector 160 receives a neighborhood size to use for determining a neighborhood of accounts for each account in a peer group. The neighborhood size may be a user-defined, system-defined, default, or any other provided numerical value used to determine a neighborhood size for an account. In one example, anomaly detector 160 receives a neighborhood size of "1000" instructing anomaly detector 160 to compare each account in a peer group to "999" of its closest neighbors in the peer group. For example, anomaly detector 160 may determine the closest "999" neighbors for each account in a peer group based on multidimensional clustering analysis output. Such multidimensional clustering analysis output may be generated when anomaly detector 160 analyzes account and transactional data for a peer group using the second clustering model associated with a set of anomaly detection factors.

In an example, anomaly detector 160 computes a scatteredness score for each account in the peer group based on the neighborhood of accounts determined for each respective account. For example, anomaly detector 160 may determine a scatteredness score for each account in a neighborhood of accounts within a set of multidimensional peer group data.

In an example, anomaly detector 160 determines a scatteredness score by measuring the distance between each account and the neighboring accounts in the account neighborhood determined for each account. For example, anomaly detector 160 may determine a scatteredness score by summing the distance between each account and its determined neighbors. Thus, anomaly detector 160 may combine the distance or difference between an account factor value associated with an account and each account factor value of each neighbor of the account existing in multidimensional output from an anomaly detection clustering model.

In addition, anomaly detector 160 may aggregate two or more sets of account factor value distances for an account and its neighbors into a single scatteredness score for the account. Anomaly detector 160 then may sort and rank each account based on a respective scatteredness score when determining which accounts in a peer group are most unusual as compared to their closest neighbors. In general, a high scatteredness score usually indicates that an account is unusual in comparison to neighboring accounts.

At block 208, security manager 170 of risk detection system 130 creates a report comprising one or more of the accounts in the peer group associated with detected anomalous account behavior. In an example, security manager 170 generates a report comprising account information, a scatteredness score, and one or more unusual factors for each of a plurality of accounts. For example, the account information may indicate some basic identifying information and descriptive information associated with each account. In addition, the report generated by security manager 170 may rank accounts by respective scatteredness scores determined by anomaly detector 160. Further, security manager 170 may provide the top 1, 3, 5, or any number of reasons or factors that most significantly contributed to each account's overall scatteredness score or unusual behavior. For example, reasons or factors contributing to a high scatteredness score may include, but are not limited to, an unusual number of senders or payment sources associated with an account, an unusual number of linked accounts, unusual withdrawal activities, etc.

In an example, security manager 170 also generates and sends alerts to security analysts, compliance regulators, or other parties based on scatteredness scores determined for one or more accounts. For example, security manager 170 may generate and send an alert to a security analyst when a scatteredness score for an account exceeds a threshold. In addition, security manager 170 may adjust security settings and permissions of an account based on a scatteredness score of an account. For example, security manager may temporarily or permanently disable an account or review/restrict some activities that an account may perform based on a scatteredness score computed for the account.

Figure 3:
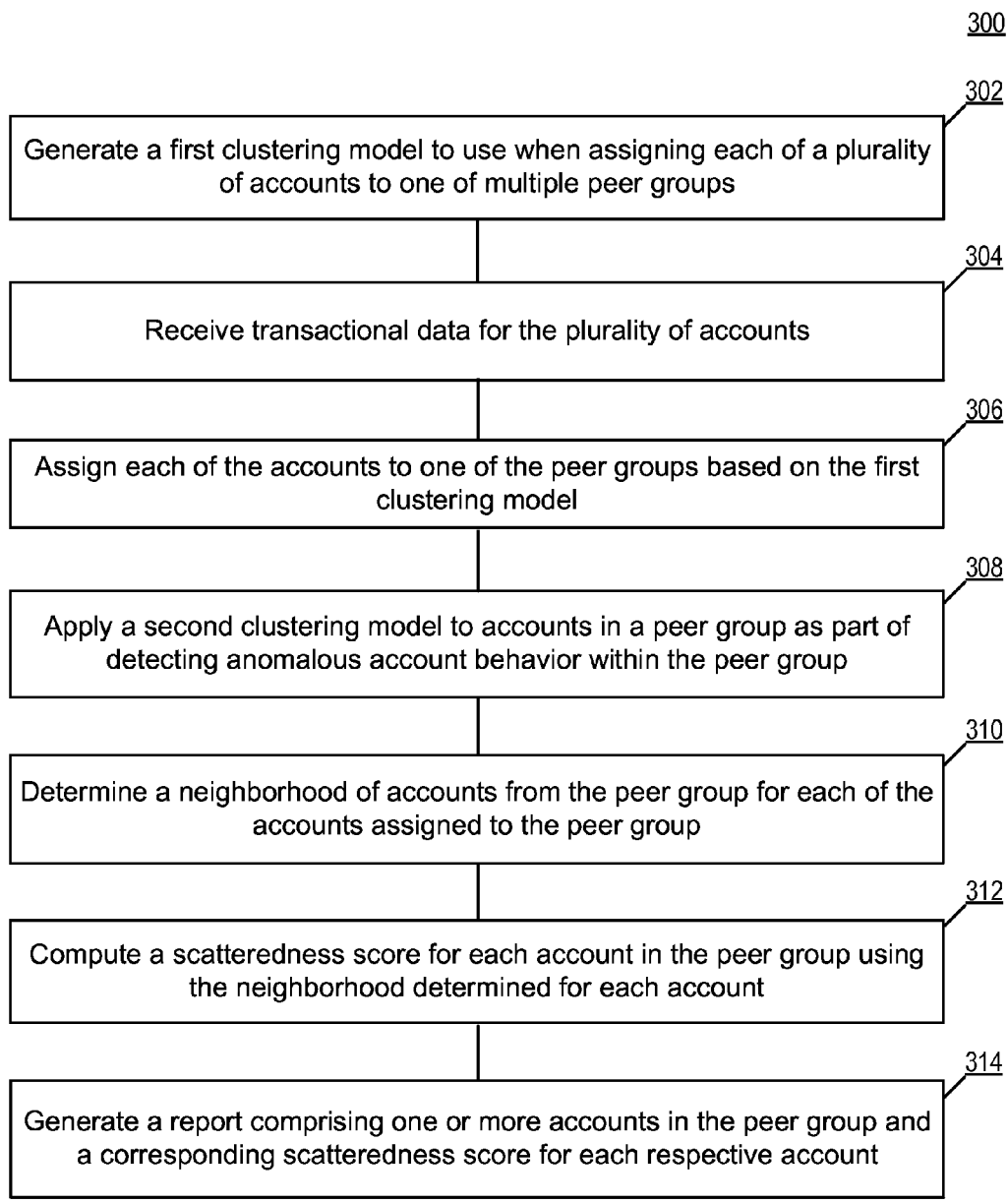
FIG. 3 is a flow diagram for detecting anomalous account behavior by applying multi-level clustering at scale to unlabeled data, in accordance with examples of the present disclosure.

FIG. 3 is a flow diagram for detecting anomalous account behavior by applying multi-level clustering at scale to unlabeled data, in accordance with examples of the present disclosure. The method 300 may be performed by processing logic that may comprise hardware (e.g., circuitry, dedicated logic, programmable logic, microcode, etc.), software (e.g., instructions run on a general purpose computer system, dedicated machine, or processing device), firmware, or a combination thereof. Examples of method 300 are described with respect to risk detection system 130 for the sake of consistency. Such examples also generally apply to other risk detection systems 130A-130N, as described herein.

Method 300 begins at block 302 when cluster analyzer 150 of risk detection system 130 generates a first clustering model to use for assigning each of a plurality of accounts to one of multiple peer groups. In an example, cluster analyzer 150 generates a first clustering model for assigning accounts among the peer groups. For example, cluster analyzer 150 may generate the first clustering model based one or more learning periods as part of a machine learning process where natural and behavioral factors of the peer groups are learned from data. In one example, the data used to generate the first clustering model during the learning period(s) may be based on one or more sets of sample data (e.g., data from one or more industries, data from one or more industry segments, data from one or more periods of time, etc.).

At block 304, data receiver 140 of risk detection system 130 receives transactional data for the plurality of accounts. In an example, data receiver 140 receives transactional and other data associated with online payment accounts. For example, data receiver 140 may receive data associated with one or more industries (e.g., auto, retail, finance, insurance, non-profits etc.), data associated with one or more industry segments (e.g., fashion, jewelry, churches, etc.), data associated with one or more geographic locations (e.g., continents, countries, regions, states, cities, counties, zip codes, etc.), data associated with one or more time periods (e.g., hours, days, weeks, months, years, etc.). In some examples, data receiver 140 receives transactional data describing both sides of a transaction and other subsequent related transactions flowing through an online payment system.

At block 306, cluster analyzer 150 of risk detection system 130 assigns each of the accounts to one of the peer groups based on the first clustering model. In an example, cluster analyzer 150 analyzes data provided by data receiver 140 and assigns each account to a peer group based on a clustering model. For example, cluster analyzer 150 may associate each account with one of any number example peer groups recognized by the first clustering model. As a non-limiting example, such peer groups may include, but are not limited to, a peer group for new accounts, a peer group for established accounts, a peer group for accounts associated with cross-border transactions, and a peer group associated with high transaction volume. Any number of additional, different, or other peer group categories and classifications may be associated with the first clustering model for the assignment of accounts.

At block 308, anomaly detector 160 of risk detection system 130 applies a second clustering model to accounts in a peer group as part of detecting anomalous account behavior within the peer group. In an example, anomaly detector 160 analyzes transactional and account data within a peer group using a second clustering model generated for detecting unusual or anomalous account behavior within a peer group. For example, anomaly detector 160 may analyze data associated with a peer group based on multidimensional clustering analysis involving various factors (e.g., behaviors or natural attributes of accounts and associated transactional data) to detect fraudulent behavior.

At block 310, anomaly detector 160 of risk detection system 130 determines a neighborhood of accounts from the peer group for each of the accounts assigned to the peer group. In an example, anomaly detector 160 receives or generates a numeric value for determining a neighborhood size for each account in a peer group. For example, the neighborhood size generally may indicate a consistent numerical count of neighboring accounts to determine for each account in a peer group. In one example, anomaly detector 160 uses a neighborhood size of "500" to determine the "499" closest or neighboring account to each account in a peer group. Thus, anomaly detector 160 determines a neighborhood of accounts associated with each account based on the neighborhood size. Anomaly detector 160 then may use the neighborhood of accounts determined for each account when computing respective scatteredness scores for each account as part of anomaly detection.

At block 312, anomaly detector 160 of risk detection system 130 computes a scatteredness score for each account in the peer group using the neighborhood determined for each respective account. In an example, anomaly detector 160 computes a scatteredness score for each account in the peer group based on the neighborhood determined for each account. For example, anomaly detector 160 may computer a scatteredness score for each account using local distance-based outlier factor (LDOF) detection to improve accuracy of detecting unusual accounts while reducing the number of false-positive results.

In an example, anomaly detector 160 uses local distance-based outlier factor detection to measure or determine how closely an account resembles or differs from its scattered neighbors in an account-specific neighborhood of a peer group. As such, the scatteredness score computed for each account generally indicates a degree to which an account deviates from its determined neighborhood within a peer group. In one example, anomaly detector 160 identifies or ranks the accounts with the highest scatteredness scores across an entire peer group as the most unusual or anomalous accounts within the peer group.

In an example, anomaly detector 160 determines a scatteredness score for an account by measuring the distance between an account and each of its determined neighbors in view of one or more factors in an anomaly detection clustering model. In one example, anomaly detector 160 aggregates two or more computed scatteredness component values for an account where each scatteredness component value is based on one or more factors. For example, the distance between an account and each of its neighbors may be determined based on each of one or more individual or combined factors in a multidimensional cluster generated from a clustering model.

In one example, a scatteredness component value based on a first factor (e.g., transaction volume) or a first combination of factors (e.g., transaction volume, account age, income level, etc.) may be aggregated with a second factor (e.g., transaction size) or a second combination of other factors (transaction size, average transaction distance, etc.). Further, various factors and computed scatteredness component values may be weighted equally or differently in the computation of an overall scatteredness score for each account in a peer group.

At block 314, security manager 170 of risk detection system 130 generates a report comprising one or more accounts in the peer group and a corresponding scatteredness score for each respective account. In an example, security manager 170 generates a report ranking a plurality of accounts in a peer group based on a scatteredness score computed for each account to indicate the most unusual accounts in a peer group. For example, security manager 170 may generate, store, and transmit a report ranking the top 10 or top 1% of unusual accounts in a peer group based on respective scatteredness scores.

In addition, security manager 170 also may include or provide one or more of the most influential or contributing factors associated with each computed scatteredness score.

For example, in the report, security manager 170 may indicate a top 1, 3, 5, or any number of factors (i.e., reasons) that contributed to each account's computed scatteredness score. Security manager 170 also may indicate one or more factors that exceeded a threshold. (e.g., factors contributing to greater than 25% or greater than 50% of an account's scatteredness score).

In an example, security manager 170 also generates and sends security or risk detection alerts to security analysts, compliance regulators, or other parties based on scatteredness scores. For example, security manager 170 may generate and send an alert to one or more parties regarding accounts with scatteredness scores exceeding a threshold. In addition, security manager 170 may enable or disable security settings and permissions based on a scatteredness score of an account. For example, security manager 170 may immediately or gradually decrease or disable permissions and privileges of an account associated with a high scatteredness score the account can be further analyzed. Security manager 170 also may immediately or gradually increase or enable permissions and privileges of an account associated with a low scatteredness score. (e.g., allow transactions of higher value).

Figure 4:
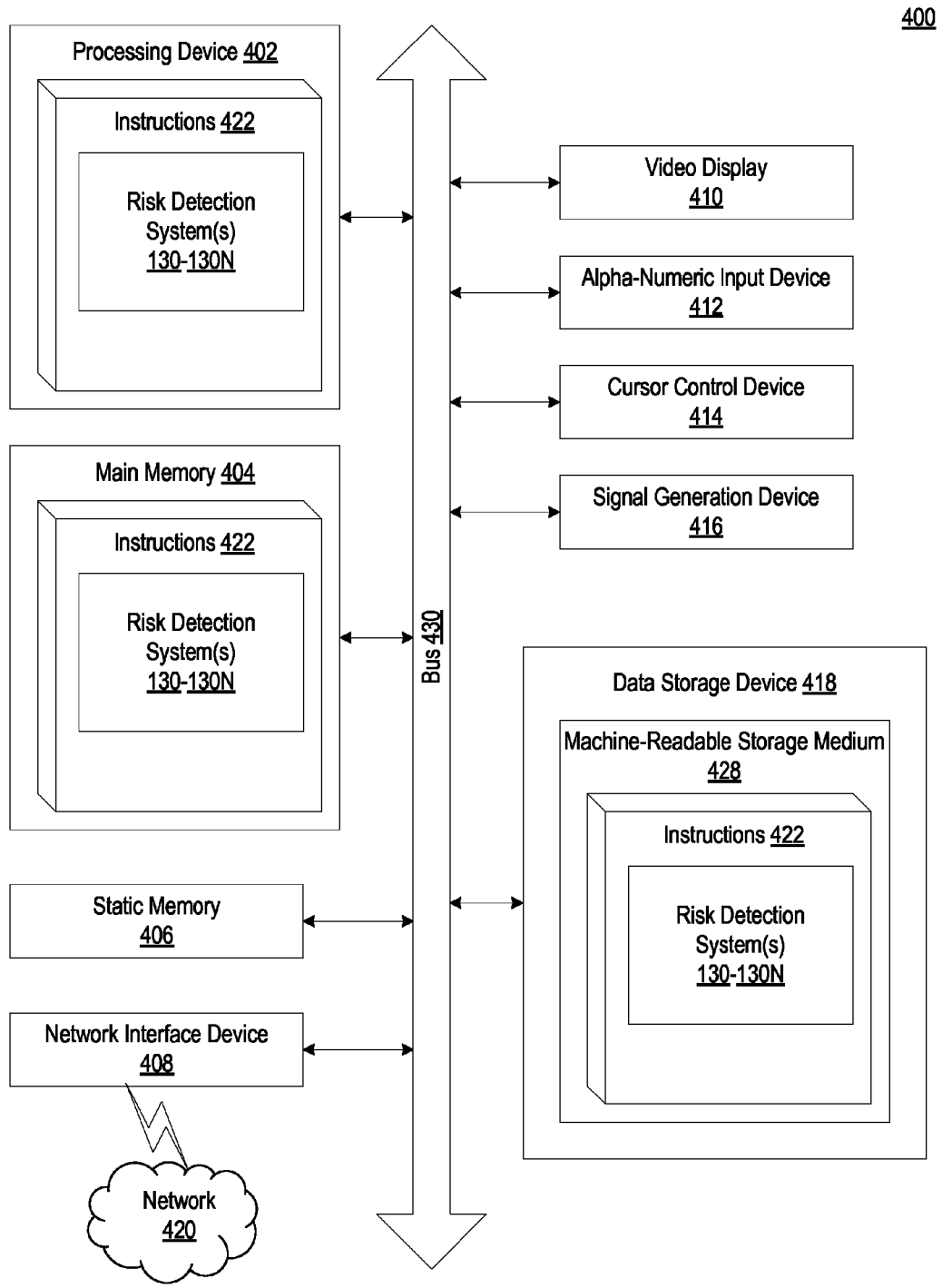
FIG. 4 is a block diagram of an exemplary computer system that may perform one or more of the operations described herein.

FIG. 4 illustrates a diagram of a machine in the exemplary form of a computer system 400, within which a set of instructions for causing the machine to perform any one or more of the methodologies discussed herein may be executed. In other examples, the machine may be connected (e.g., networked) to other machines in a LAN, an intranet, an extranet, or the Internet. The machine may operate in the capacity of a server or a client device in client-server network environment, or as a peer machine in a peer-to-peer (or distributed) network environment. The machine may be a personal computer (PC), a tablet PC, a set-top box (STB), a Personal Digital Assistant (PDA), a cellular telephone, a wearable computing device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 also may be one or more special-purpose processing devices such as an application specific integrated circuit (ASIC), a field programmable gate array (FPGA), a digital signal processor (DSP), network processor, or the like. The processor 402 is configured to execute instructions 422 for performing the operations and steps discussed herein.

The computer system 400 also may include a network interface device 408. The computer system 400 may further include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 428 on which is stored one or more sets of instructions 422 (e.g., software computer instructions) embodying any one or more of the methodologies or functions described herein. The instructions 422 also may reside, completely or at least partially, within the main memory 404 and/or within the processor 402 during execution thereof by the computer system 400, the main memory 404 and the processor 402 also constituting computer-readable storage media. The instructions 422 may be transmitted or received over a network 420 via the network interface device 408.

In one example, the instructions 422 include instructions for one or more modules of a risk detection system (e.g., risk detection system 130, 130A, 130N of FIG. 1) and/or a software library containing methods that call a risk detection system 130, 130A, 130N. While the computer-readable storage medium 428 (machine-readable storage medium) is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" also may include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Numerous details are set forth in the foregoing description. However, it will be apparent to one of ordinary skill in the art having the benefit of this disclosure that the present disclosure may be practiced without these specific details. In some instances, well-known structures and devices are shown in block diagram form, rather than in detail, to avoid obscuring the present disclosure.

Some portions of the detailed description have been presented in terms of algorithms and symbolic representations of operations on data bits within a computer memory. Here, an algorithm is generally conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing," "comparing," "associating," "applying," "transmitting," "receiving," "processing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure therefore should be determined with reference to the appended claims, along with the full scope of equivalents to which such claims are entitled.

What is claimed is:

1. A computer system, comprising:
a non-transitory memory storing instructions; and
one or more hardware processors coupled to the non-transitory memory and configured to read the instructions from the non-transitory memory to cause the computer system to perform operations comprising:
receiving data for a first account;
analyzing the data based on a clustering model;
assigning the first account to a peer group associated with the clustering model, the peer group comprising one or more second accounts;
determining a scatteredness score for the first account, the scatteredness score being determined in view of a neighborhood of accounts in the peer group;
determining whether the scatteredness score exceeds a predetermined threshold; and
automatically disabling the first account when the scatteredness score exceeds the predetermined threshold.

2. The computer system of claim 1, wherein the operations further comprise generating the clustering model.

3. The computer system of claim 1, wherein the clustering model is a k-means clustering model.

4. The computer system of claim 1, wherein the clustering model is a Gaussian mixture clustering model.

5. The computer system of claim 1, wherein the operations further comprise analyzing based on a second clustering model.

6. The computer system of claim 5, wherein the second clustering model is a k-means clustering model.

7. The computer system of claim 5, wherein the second clustering model is a Gaussian mixture clustering model.

8. The computer system of claim 5, wherein the scatteredness score is computed in view of output from analyzing the data based on the second clustering model.

9. The computer system of claim 1, wherein the operations further comprise receiving a neighborhood size to use when determining the neighborhood of accounts for.

10. The computer system of claim 1, wherein the operations further comprise determining the neighborhood of accounts in the peer group.

11. The computer system of claim 1, wherein the peer group corresponds to one of a new account peer group, an established account peer group, a cross-border account peer group, or a high-volume account peer group.

12. The computer system of claim 1, wherein the data comprises transactional payment flow data associated with payment accounts of a payment service provider.

13. A non-transitory machine-readable medium having stored thereon machine-readable instructions executable to cause a machine to perform operations comprising:
receiving data for a first account;
analyzing the data based on a clustering model;
assigning the first account to a peer group associated with the clustering model, the peer group comprising one or more second accounts;
determining a scatteredness score for the first account, the scatteredness score being determined in view of a neighborhood of accounts in the peer group;
determining whether the scatteredness score exceeds a predetermined threshold; and
automatically disabling the first account when the scatteredness score exceeds the predetermined threshold.

14. The non-transitory machine-readable medium of claim 13, the operations further comprising:
generating the clustering model.

15. The non-transitory machine-readable medium of claim 13, the operations further comprising:
receiving a neighborhood size to use when determining the neighborhood of accounts.

16. The non-transitory machine-readable medium of claim 13, the operations further comprising:
determining the neighborhood of accounts.

17. A computer-implemented method for detecting anomalous account behavior, comprising:
receiving, by one or more processing devices, data for a first account;
analyzing, by the one or more processing devices, the data based on a clustering model;
assigning, by the one or more processing devices, the first account to a peer group associated with the clustering model, the peer group comprising one or more second accounts;
determining, by the one or more processing devices, a scatteredness score for the first account, the scatteredness score being determined in view of a neighborhood of accounts in the peer group;
determining, by the one or more processing devices, whether the scatteredness score exceeds a predetermined threshold; and
automatically disabling, by the one or more processing devices, the first account when the scatteredness score exceeds the predetermined threshold.

18. The computer-implemented method of claim 17, further comprising:
generating the clustering model.

19. The computer-implemented method of claim 17, further comprising:
receiving a neighborhood size to use when determining the neighborhood of accounts.

20. The computer-implemented method of claim 17, further comprising:
determining the neighborhood of accounts.

* * * * *

UNITED STATES PATENT AND TRADEMARK OFFICE
CERTIFICATE OF CORRECTION

| | |
|---|---|
| PATENT NO. | : 9,953,160 B2 |
| APPLICATION NO. | : 14/881976 |
| DATED | : April 24, 2018 |
| INVENTOR(S) | : Avani Goel Sharma et al. |

It is certified that error appears in the above-identified patent and that said Letters Patent is hereby corrected as shown below:

In the Claims

In Claim 5, Column 13, Line 55, change "analyzing based on" to --analyzing the data based on--.

Signed and Sealed this
Twenty-fourth Day of July, 2018

Andrei Iancu
*Director of the United States Patent and Trademark Office*